United States Patent [19]

Feser et al.

[11] 4,267,448

[45] May 12, 1981

[54] ION DETECTOR WITH BIPOLAR ACCELERATING ELECTRODE

[75] Inventors: Karl Feser, Hamburg; Curt Brunnée, Platjenwerbe, both of Fed. Rep. of Germany

[73] Assignee: Varian Mat GmbH, Bremen, Fed. Rep. of Germany

[21] Appl. No.: 45,144

[22] Filed: Jun. 4, 1979

[30] Foreign Application Priority Data

Jun. 12, 1978 [DE] Fed. Rep. of Germany ....... 2825760

[51] Int. Cl.³ ............................................ B01D 59/44
[52] U.S. Cl. ................................... 250/281; 250/283; 250/282
[58] Field of Search ............... 250/281, 282, 283, 285, 250/299, 397

[56] References Cited

U.S. PATENT DOCUMENTS

| 3,774,028 | 11/1973 | Daly | 250/299 |
| 3,898,456 | 8/1975 | Dietz | 250/283 |

Primary Examiner—Bruce C. Anderson
Attorney, Agent, or Firm—Sughrue, Rothwell, Mion, Zinn and Macpeak

[57] ABSTRACT

The ion detector of a mass spectrometer includes an accelerating electrode 10, 34, 38 disposed between the spectrometer discharge shutter 6 and a secondary electron multiplier 18. The electrode 10 is selectively energized by a high positive or negative voltage opposite the initial polarity of the ions by a source 16. Thus, a positively energized electrode draws in and accelerates negative ions, and strips away their electrons to leave them positively charged for further acceleration into the first dynode of the secondary electron multiplier.

11 Claims, 3 Drawing Figures

ION DETECTOR WITH BIPOLAR ACCELERATING ELECTRODE

BACKGROUND OF THE INVENTION

This invention relates to an ion detector for use in a mass spectrometer.

An apparatus of this general type for the detection of both uncharged particles and ions is described in Scientific Instruments, Vol. 8, p. 321 (1976). This apparatus, however, is not well suited for the uniform and equal detection of both positive and negative ions leaving the discharge slot of a mass spectrometer.

SUMMARY OF THE INVENTION

The apparatus according to this invention has a surprisingly good detection sensitivity for both positive and negative ions. The unsatisfactory operation of the known device is presumably traceable to the fact that the ions expelled through the discharge opening of the spectrometer have a relatively low velocity. As a result, the velocity of the ions is modified to very different degrees by the field of the secondary electron multiplier, depending on the sign of its charge. This problem is met in the apparatus according to the invention in that the conversion element, which is formed as an additional electrode, can be connected to a high positive potential for the detection of negative ions, and to a high negative potential for the detection of positive ions. A strong acceleration of all ions is thus obtained, which then strike the conversion element at high speed and release secondary ions therefrom. The only substantial difference between the detection of equal mass ions with positive and negative charges in the apparatus according to the invention is that additional electrons are stripped from the shells of negative ions when they strike the conversion element, which somewhat improves the sensitivity.

A further advantage of the apparatus according to the invention is that the ions are so strongly additionally accelerated that even the heavy ions strike the conversion element so rapidly that a large number of secondary electrons are released. In contrast, in the known apparatus the impact velocity of the heavy ions on the conversion element is relatively low, so that only a very low sensitivity for these ions is obtained.

The improved sensitivity for heavy ions achieved in the apparatus according to the invention also allows the secondary electron multiplier to be operated at lower voltages than those previously used, which noticeably increases its useful life.

The apparatus according to the invention can be used equally well with the various known types of secondary electron multipliers, including discontinuous secondary electron multipliers which have a plurality of co-molded dynodes, and continuous secondary electron multipliers which are formed as tubes on the inner wall of which the secondary electrons repeatedly impact as they pass through axially, thus releasing additional secondary electrons.

The apparatus according to the invention can also be used equally well with various types of mass spectrometers, including quadrupole spectrometers and magnetic field spectrometers.

In making the transition from the detection of ions of one polarity to the detection of ions of the other polarity, in principle the first-used high voltage power unit can be exchanged for one of the other polarity. With the further development of the invention, a particularly simple transition between the two types of detection is possible.

DETAILED DESCRIPTION OF THE PREFERRED EMBODIMENTS

Figure 1:
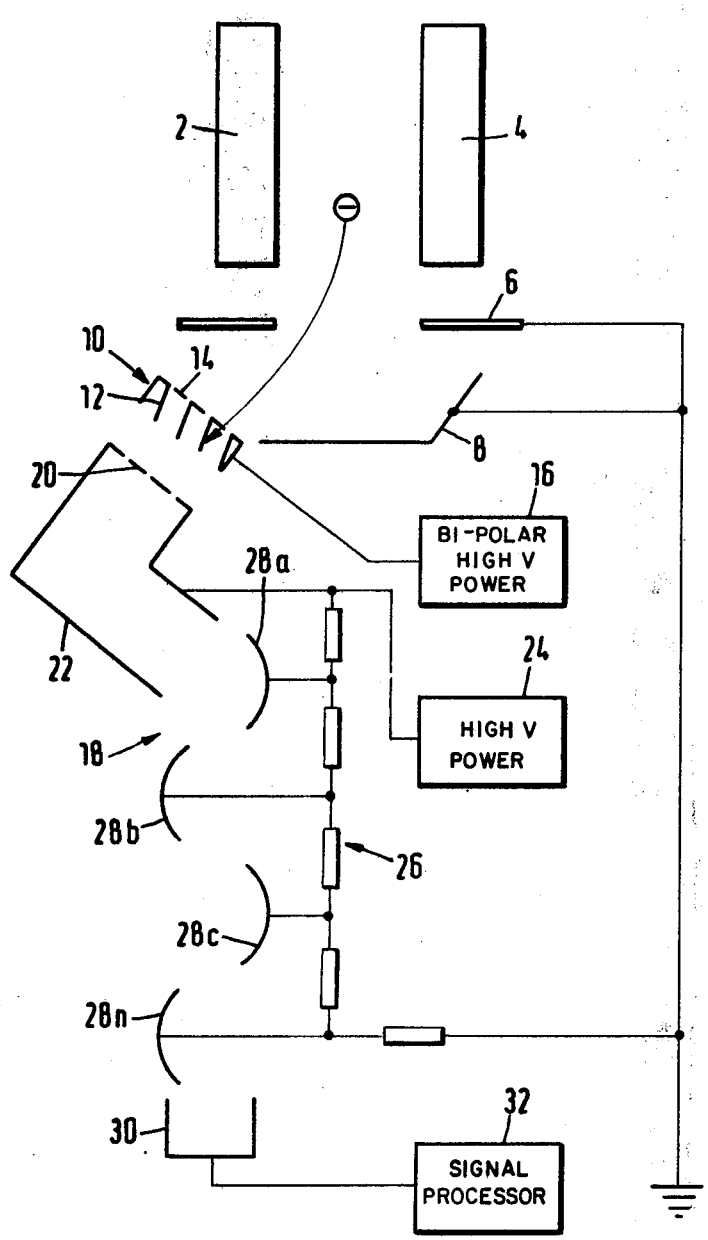
FIG. 1 shows a schematic illustration of an apparatus for the detection of ions of both types of polarity in which the axis of the detection arrangement runs parallel to the axis of a quadrupole spectrometer.

FIG. 1 schematically shows two of the four pole rods 2, 4 of a quadrupole spectrometer. A first discharge shutter 6 of the spectrometer is connected to ground, as is a diverting shutter 8. These can also be provided with openings through which uncharged particles can pass.

A stainless steel acceleration electrode 10 of the venetian blind type is arranged at the side of the diverting shutter 8, and has shutter bodies 12 and a screen gate 14 arranged at an angle. The latter prevents the backward scattering of stray charged particles.

The acceleration electrode 10 is connected to a high voltage power unit 16, which can have a relatively high inner resistance because no appreciable current flows to the electrode 10. The polarity of the discharge voltage of the power unit 16 is sometimes positive and sometimes negative.

As seen in the direction of movement, a secondary electron multiplier 18 is arranged behind the electrode 10, the input of which is covered by a screen grid 20 and the first dynode 22 of which is connected to a second high voltage power unit 24. The output of the power unit 24 is also connected to further dynodes 28a through 28n of the secondary electron multiplier 18 by a voltage distributor 26. An electron collector 30 of the secondary electron multiplier 18 is connected to a schematically illustrated circuit 32 for processing the current signals. The entire detector, together with the mass spectrometer, is located in a high vacuum container.

The detector operates as follows, with the power unit 24 giving a continuous negative voltage of, for example, 2 kV. Thus the first dynode 22, which is connected directly to the power unit 24, has a high negative potential, and the last dynode in the series of dynodes is connected to a potential which approaches ground.

To detect negative ions the power unit 16 is set to a positive output voltage of between 1 and 10 Kv, at least 2 to 3 kV, and preferably 3 to 4 kV. The negative ions flying through the discharge shutter 6 are diverted toward the acceleration electrode 10 by the high voltage thereof, and are significantly accelerated. When the negative ions impact on the inclined shutter bodies 12, the majority lose their charge by the stripping away of their shell electrons. These now positively charged ions are further accelerated on the way to the first dynode 22 of the secondary electron multiplier 18, which as usual has a negative potential, and said ions thus release an especially large number of electrons at the first dynode as they impact thereon. In this manner an extremely good detection sensitivity for negative ions is obtained due to their initial acceleration by and loss of charge at the acceleration electrode, and their further acceleration on the way to the first dynode of the secondary electron multiplier 18. The stripped-off electrons, which have a relatively low velocity, are collected by the screen grid 14 and the shutter bodies 12 and removed. All that need be done is to connect the high voltage power unit 16 to the proper current source.

To detect positive ions the high voltage power unit 16 is set to have a negative output voltage, this voltage being at least 500 V, and preferably between 3 and 10 kV more negative than the first dynode 22 of the secondary electron multiplier 18. The velocity of the ions is thus again increased by the acceleration electrode. Secondary electrons result from the impacting of the ions on the shutter bodies 12. This electron current is further amplified at the subsequent dynodes 28a through 28n and conveyed to the circuit 32 by means of the electron collector 30.

Figure 2:
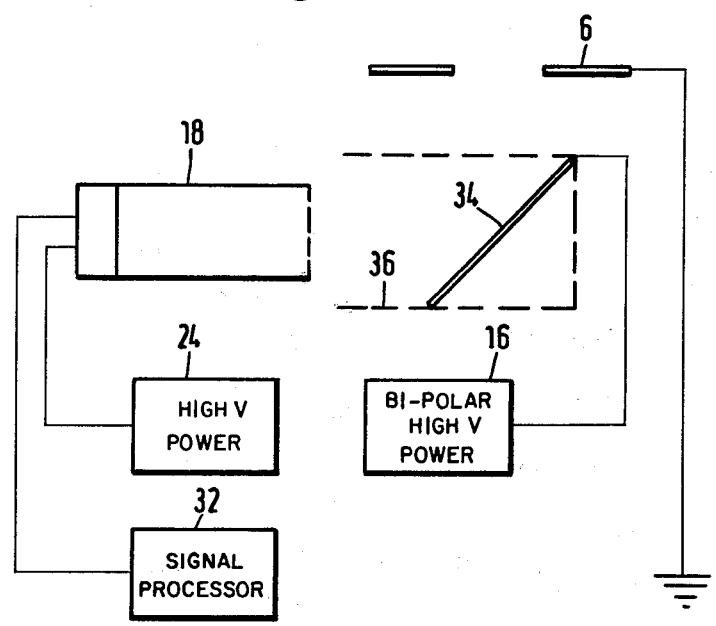
FIG. 2 shows a schematic illustration of a second apparatus for the detection of ions, particularly for use with a magnetic field mass spectrometer, in which the axis of the detector arrangement runs perpendicular to the axis of the spectrometer.

In FIG. 2, corresponding elements shown in FIG. 1 have the same reference numerals. The secondary electron multiplier 18, however, is here arranged with its axis perpendicular to the axis of the mass spectrometer, of which only the discharge shutter 6 is shown.

The acceleration electrode 34 is formed as a high-quality steel plate, inclined by 45° to the detector and spectrometer axes, so that the ions are led into the entrance opening of the secondary electron multiplier 18 by reflection. A cylindrical screen 36 is arranged around the acceleration electrode, which represents an electrostatic lens for focusing the ions on the secondary electron multiplier.

Figure 3:
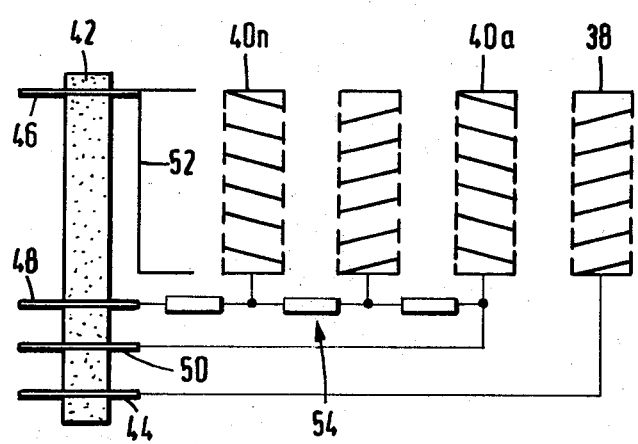
FIG. 3 shows a schematic illustration of a detector arrangement, which has an overall similar construction as a common secondary electron multiplier.

FIG. 3 shows a combination of an acceleration electrode and a subsequent secondary electron multiplier which are manipulable as a unit. An accleration electrode 38 and dynodes 40a through 40n have the same mechanical construction. They have respective shutter bodies (venetian type) disposed at an angle to the detector axis. Pins 44, 46, 48 and 50 are embedded in a common connecting socket 42 and are connected with the acceleration electrode 38, an electron collector 52, the end of the voltage distributor 54 connected to ground, and the first dynode 40a which is connected to a high voltage source.

It is clear to see that this type of detector has a highly modular construction and that in designing and manufacturing the acceleration electrodes the same procedures can be followed as with the manufacture of the dynodes. The only difference is that the material of the acceleration electrode can be freely selected, preferably from a high-quality steel, while the dynode material is selected in view of the simple release of electrons. The holders of the dynodes can also be used as the holders of the acceleration electrodes.

What is claimed is:

1. An apparatus for detecting ions generated by mass spectrometers, comprising: a conversion element which the ions strike, a secondary electron multiplier disposed after the conversion element in the direction of ion travel, said electron multiplier having an output that approaches ground potential, a high voltage source for the secondary electron multiplier, said conversion element comprising an accelerating electrode (10, 34, 38) disposed before and adjacent to the input of the secondary electron multiplier (18), and a separate, selective bi-polarity high voltage source (16) connected to the accelerating electrode, said accelerating electrode being impressed with a potential more negative than a first dynode of the secondary electron multiplier when detecting positive ions, and being impressed with a potential more positive than said first dynode when detecting negative ions.

2. Apparatus according to claim 1, wherein the accelerating electrode (10) is formed as a permeable screen.

3. Apparatus according to claim 2, wherein the accelerating electrode is of the venetian blind type.

4. Apparatus according to claim 1, wherein the accelerating electrode (10) is formed as a diverting plate (34).

5. Apparatus according to any one of claims 1 through 4, wherein the accelerating electrode (10 or 34) is provided at least on its input side with a screen grid (14 or 36).

6. Apparatus according to any one of claims 1 through 4, wherein the accelerating electrode (38) and the secondary electron multiplier (40a through 40n, 52) comprise a modular jointly manipulable unit.

7. Apparatus according to claim 6, further comprising a joint plug connector (42 through 50) for the accelerating electrode (38) and the secondary electron multiplier (40a through 40n, 52).

8. A method for operating an apparatus for detecting ions generated by mass spectrometers, comprising; supplying a first dynode of a secondary electron multiplier with a high negative potential with the last dynode thereof connected to a potential which approaches ground, and; connecting an accelerating electrode to a potential at least 500 V more negative than the first dynode of the secondary electron multiplier, when detecting positive ions.

9. A method according to claim 8, wherein the accelerating electrode is connected to a potential between 3 and 10 kV more negative than the first dynode of the secondary electron multiplier.

10. A method for operating an apparatus for detecting ions generated by mass spectrometers, comprising: supplying a first dynode of a secondary electron multiplier with a high negative potential with the last dynode thereof connected to a potential which approaches ground, and; connecting an accelerating electrode to a positive potential between 1 and 10 kV when detecting negative ions.

11. A method according to claim 10, wherein the accelerating electrode is connected to a positive potential between 3 to 4 kV.

* * * * *

REEXAMINATION CERTIFICATE (392nd)

United States Patent [19]

Feser et al.

[11] B1 4,267,448

[45] Certificate Issued  Sep. 24, 1985

[54] ION DETECTOR WITH BIPOLAR ACCELERATING ELECTRODE

[75] Inventors: Karl Feser, Hamburg; Curt Brunnée, Platjenwerbe, both of Fed. Rep. of Germany

[73] Assignee: Finnigan Mat GmbH, Bremen, Fed. Rep. of Germany

Reexamination Request:
No. 90/000,602, Aug. 3, 1984

Reexamination Certificate for:
Patent No.: 4,267,448
Issued: May 12, 1981
Appl. No.: 45,144
Filed: Jun. 4, 1979

[30] Foreign Application Priority Data

Jun. 12, 1978 [DE]  Fed. Rep. of Germany ....... 2825760

[51] Int. Cl.³ ............................................. B01D 59/44
[52] U.S. Cl. .................................... 250/281; 250/282; 250/283
[58] Field of Search ............... 250/281, 282, 283, 285, 250/299, 397

[56] References Cited

U.S. PATENT DOCUMENTS 3,774,028  11/1973  Daly ................................. 250/299
3,898,456   8/1975  Dietz ................................ 250/283
4,423,324  12/1983  Stafford ........................... 250/281

OTHER PUBLICATIONS

C. La Lau, in A. L. Burlingame (editor), a contributed paper entitled "Mass Discrimination caused by Electron-Multiplier Detectors", *Advances in Analytical Chemistry and Instrumentation,* vol. 8, Topics on Organic Spectrometry, Wiley-Interscience, New York, 1970, p. 93.

*Primary Examiner*—Bruce C. Anderson

[57]  ABSTRACT

The ion detector of a mass spectrometer includes an accelerating electrode 10, 34, 38 disposed between the spectrometer discharge shutter 6 and a secondary electron multiplier 18. The electrode 10 is selectively energized by a high positive or negative voltage opposite the initial polarity of the ions by a source 16. Thus, a positively energized electrode draws in and accelerates negative ions, and strips away their electrons to leave them positively charged for further acceleration into the first dynode of the secondary electron multiplier.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 8 is cancelled.

Claims 1 and 9-11 are determined to be patentable as amended.

Claims 2-7, dependent on an amended claim, are determined to be patentable.

1. An apparatus for detecting ions generated by mass spectrometers, comprising: a conversion element which the ions strike, *negative ions impacting said conversion element to be converted to positively charged ions,* a secondary electron multiplier disposed after the conversion element in the direction of ion travel, said electron multiplier having an output that approaches ground potential, a high voltage source for the secondary electron multiplier, said conversion element comprising an accelerating electrode (10, 34, 38) disposed before and adjacent to the input of the secondary electron multiplier (18), and a separate, selective bi-polarity high voltage source (16) connected to the accelerating electrode, said accelerating electrode being impressed with a potential more negative than a first dynode of the secondary electron multiplier when detecting positive ions, and being impressed with a potential more positive than said first dynode when detecting negative ions.

9. A method according to claim [8] *10*, wherein the accelerating electrode is connected to a potential [between 3 and 10 kV] *at least 500 volts* more negative than the first dynode of the secondary electron multiplier *when detecting positive ions.*

10. A method for operating an apparatus for detecting ions generated by mass spectrometers, comprising: supplying a first dynode of a secondary electron multiplier with a high negative potential with the last dynode thereof connected to a potential which approaches ground, [and;] *disposing a conversion element comprising an accelerating electrode before and adjacent to the first dynode, negative ions impacting said conversion element to be converted to positively charged ions,* connecting [an] *said* accelerating electrode to *a selective bi-polarity high voltage source so that said accelerating electrode may be impressed with* a positive potential between 1 and 10 kV when detecting negative ions *and alternatively with a potential more negative than the first dynode when detecting positive ions.*

11. A method according to claim 10, wherein the accelerating electrode is connected to a positive potential between 3 to 4 kV *when detecting negative ions.*

* * * * *